United States Patent [19]

Johnson et al.

[11] Patent Number: 5,269,091
[45] Date of Patent: Dec. 14, 1993

[54] PORTABLE PEST ELECTROCUTION DEVICE

[75] Inventors: William L. Johnson, Somis; William R. Luther, Santa Paula; Robert G. Noe, Ojai, all of Calif.

[73] Assignee: Agrizap, Inc., Ojai, Calif.

[21] Appl. No.: 875,754

[22] Filed: Apr. 29, 1992

[51] Int. Cl.[5] ............................................. A01M 23/02
[52] U.S. Cl. ............................................ 43/98; 43/112
[58] Field of Search ......................... 43/98, 112, 99, 107

[56] References Cited

U.S. PATENT DOCUMENTS

| | | |
|---|---|---|
| 909,814 | 1/1909 | Norris . |
| 1,031,442 | 7/1912 | Haxton . |
| 1,541,985 | 6/1925 | Marquis . |
| 1,680,594 | 8/1928 | Connolly et al. . |
| 2,003,513 | 6/1935 | Myers . |
| 2,098,884 | 11/1937 | Rousseau . |
| 2,161,789 | 6/1939 | Wingfield . |
| 2,191,127 | 2/1940 | Hazel . |
| 2,420,723 | 5/1947 | Ratchford . |
| 2,595,130 | 4/1952 | Edwards . |
| 3,197,916 | 8/1965 | Cole, Jr. et al. . |
| 3,388,497 | 6/1968 | Levine . |
| 3,468,054 | 9/1969 | Levine . |
| 3,792,547 | 2/1974 | Day . |
| 3,827,176 | 8/1974 | Stirewalt . |
| 4,048,746 | 9/1977 | Dye . |
| 4,074,456 | 2/1978 | Tidwell . |
| 4,205,480 | 6/1980 | Gartner . |
| 4,497,130 | 2/1985 | Fitzgerald . |
| 4,780,985 | 11/1988 | Coots . |
| 4,949,500 | 8/1990 | Jefferys ......................... 43/98 |

FOREIGN PATENT DOCUMENTS 2107164 4/1983 United Kingdom .................... 43/98

Primary Examiner—Mark Rosenbaum
Assistant Examiner—James Miner
Attorney, Agent, or Firm—Irell & Manella

[57] ABSTRACT

A pest electrocution device includes a mechanical portion and an electronic portion. The mechanical portion includes a base member with sidewalls defining a basin, a flexible sheet member secured on the base member, and a conductive plate member which is attached on the top face of the flexible sheet member and has at least part of it not overlapping the shoulder of the sidewalls. A pair of opposing metal contacts are respectively fastened on the bottom face of the flexible sheet member and on the base member. The metal contacts are coupled to the trigger input of the electronic circuit portion while the conductive plate member is coupled to the high voltage output of the electronic circuit portion. The electronic circuit portion includes a timer for producing a timing and control signal and a high voltage generator for generating a high voltage current. The electronic circuit portion further includes a latch circuit which records the status of the device for the user to check the status at any time. The electronic circuit portion also includes a pulse generation circuit for generating a high voltage, low current pulse train.

18 Claims, 5 Drawing Sheets

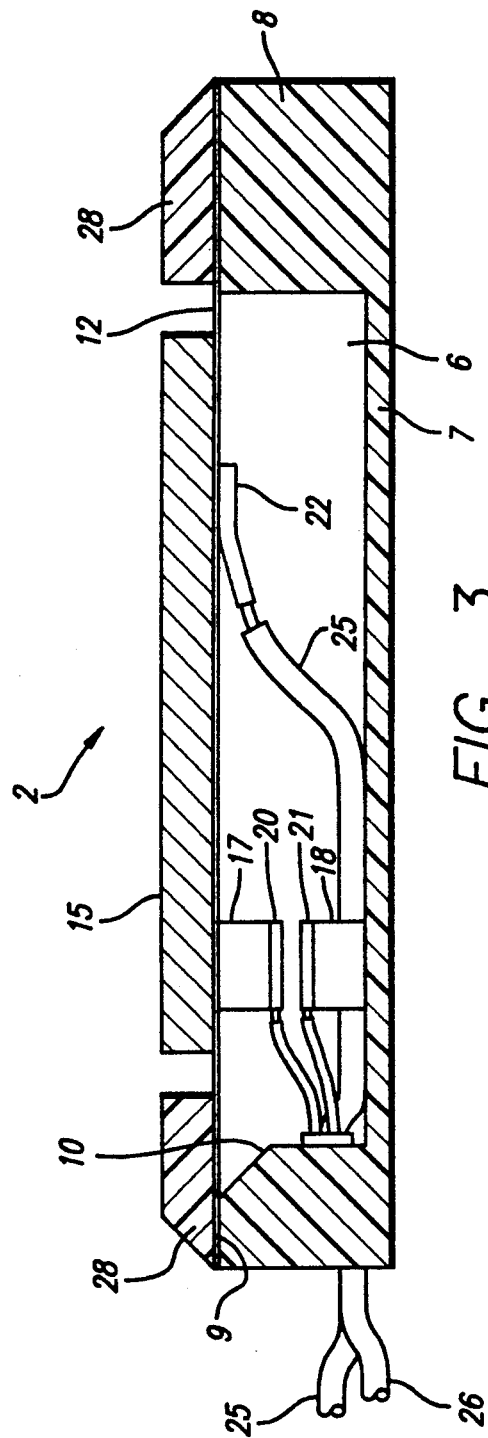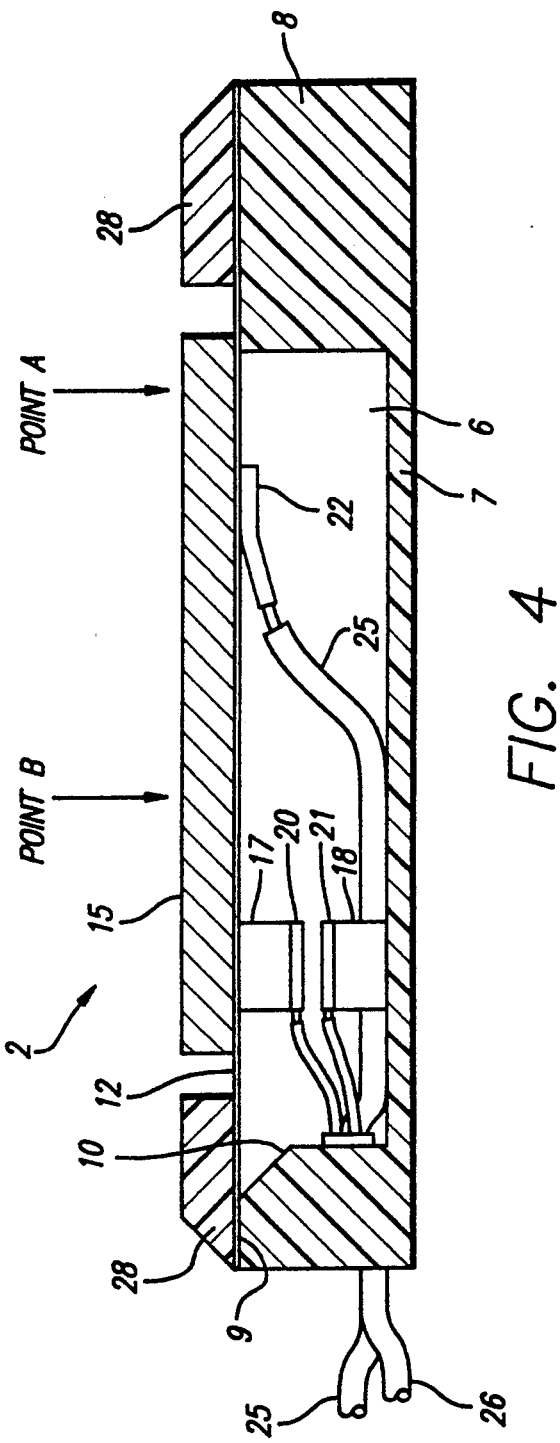

PORTABLE PEST ELECTROCUTION DEVICE

FIELD OF THE INVENTION

The present invention relates to a device for eliminating pests, and more particularly, to a pest electrocution device for effectively electrocuting pests, such as rodents and the like.

BACKGROUND OF THE INVENTION

Residential areas and other places are often disturbed by pests, such as gophers and other burrowing animals which cause large amounts of damage to grounds, lawns and gardens. Numerous traps have been designed in the past for eliminating these animals. However, many of these conventional rodent traps have complicated structures in that they are either hard to manufacture or are inconvenient to use. Some of these conventional traps are large and thus the places of their use are limited. Available conventional traps are not 100% effective, thus leaving considerable room for improvement.

A preliminary patentability search was conducted by the applicant which reveals a number of U.S. patents. None of the prior art patents show or suggest applicant's device, especially the features and advantages of the present invention.

U.S. Pat. No. 1,541,985 issued on Jan. 3, 1925 to George A. Marquis discloses an electrocuting rat trap. The trap includes a large circular metallic plate and a small circular metallic plate which is supported on the large metallic plate by a semispherical pivot head and a coil spring. Each of the metallic plates is provided with a contact ring. During use, a bait is placed in a bait holder on the small metallic plate. When a rodent steps on the small metallic plate to remove the bait while the hind legs rest on the lower plate, the two contact rings are thereby brought into engagement with each other. Thus, a circuit using a transformer is turned on to electrocute the rodent. In order to initiate electrocution, the rodent must stand on both the large and the small metallic plates at the same time. This design is inefficient because the rodent may easily disengage from the plates, thereby stopping the electrocution before death, particularly when the front legs of the rodent are withdrawn from the small metallic plate due to the rodent's reaction to the shock.

U.S. Pat. No. 4,048,746 issued on Sep. 20, 1977 to Joseph R. Dye shows an electronic device used to exterminate rodents in their burrows without the removal of soil. The device includes a stick-type carrier for insertion into the soil, a metal sleeve which is installed on the tip of the carrier constituting an electric ground, and two brass rings which are secured on the stick-type carrier serving as touch control and high voltage electrodes. The device further includes a circuit which is connected to the metal sleeve and the two brass rings to test the location of a burrow and provide high voltage current. The circuit includes two control transistors, a relay and a high voltage transformer. The circuit is also provided with a light which gives a continuously visual alarm indicating that a rodent has been electrocuted. This device consumes a good deal of power because the alarm light is illuminated continuously until the user removes the carrier. Further, if the device is not optimally disposed in a burrow, the rodent may not touch the carrier at all. Furthermore, the rodent can easily disengage from the carrier if the rodent is not electrocuted by the first dose of high voltage current.

U.S. Pat. No. 3,468,054 issued on Aug. 15, 1967 to Irving Levine discloses an electrical rodent exterminator. The exterminator includes a casing which has a rodent entrance chamber and metal grids therein. A bait is disposed on the rear wall in the casing. The front of the rodent entrance chamber is open for rodents. There is a swinging baffle hanging vertically in the chamber. If a rodent which comes into the chamber for the bait stands on the grids and pushes the swinging baffle, the swinging baffle will rotate a rod which, in turn, closes the switch in a circuit for electrocuting the rodent. The circuit includes a transformer and a clock timer for providing a timed cycle of high voltage current to the grids. The circuit also has a signal lamp which is turned on after electrocution. Obviously, this type of exterminator has a complicated structure and is not suitable for use in a burrow or other restricted area due to its large size. The exterminator is also power inefficient due to the continual illumination of the signal lamp. In addition, this device is not efficient because electrocution of the rodent requires that the rodent first find the entrance, then move into the chamber, and finally push the swinging baffle in order to trigger the circuit.

Other conventional rodent traps are disclosed in a number of patents including U.S. Pat. No. 4,780,985 issued on Nov. 1, 1988 to Clande G. Coots; U.S. Pat. No. 4,497,130 issued on Feb. 5, 1985 to John P. Fitzgerald; U.S. Pat. No. 4,205,480 issued on Jun. 3, 1980 to William J. Gartner; U.S. Pat. No. 3,827,176 issued on Aug. 6, 1974 to Homer A. Stirewalt; U.S. Pat. No. 4,074,456 issued on Feb. 21, 1978 to Robert Wayne Tedwell; U.S. Pat. No. 3,792,547 issued on Feb. 19, 1974 to Leon E. Day; U.S. Pat. No. 3,197,916 issued on Aug. 3, 1965 to S. L. Cole, Jr., et al; U.S. Pat. No. 3,388,497 issued on Jun. 18, 1968 to I. Levine; U.S. Pat. No. 909,814 issued on Jan. 12, 1909 to Hosea Haxton; U.S. Pat. No. 1,680,594 issued on Aug. 14, 1928 to T. F. Connolly et al; U.S. Pat. No. 2,003,513 issued on Jun. 4, 1935 to L. D. Myers; U.S. Pat. No. 2,098,884 issued on Nov. 9, 1937 to E. B. Rousseau; U.S. Pat. No. 2,161,789 issued on Jun. 13, 1939 to G. L. Wingfield; U.S. Pat. No. 2,191,127 issued on Feb. 20, 1940 to C. T. Hazel; U.S. Pat. No. 2,420,723 issued on May 20, 1947 to H. L. Ratchford; and U.S. Pat. No. 2,595,130 issued on Apr. 29, 1952 to L. R. Edwards. These conventional rodent traps normally include a chamber or channel in which a bait is used to attract the rodent. The rodent has to find the entrance of the chamber before taking the bait. When a mechanical switch in the chamber is touched or moved by the rodent, a circuit is completed to electrocute the rodent. In some of the conventional rodent traps, two elements have to be contacted or pushed at the same time by the rodent in order to trigger the circuit. In addition, these traps are either complicated to manufacture or are inconvenient to use.

Thus, it is an object of the present invention to provide a pest electrocution device which has a simple structure but yet provides high efficiency in dispatching pests such as rodents.

Another object of the present invention is to provide a rodent electrocution device which can be made small in size and without use of a chamber structure so that they can be disposed in rodent burrows or other tight places.

Still another object of the invention is to provide a rodent electrocution device with a trigger mechanism having adjustable sensitivity to actuate the electrocution.

A further object of the present invention is to provide a rodent electrocution device with a mechanism by which the rodent cannot easily break contact once power is applied.

A still further object of the present invention is to provide a status-checking mechanism which allows the user to check the status of the device at any time without interfering with the environment in which the device is located, and without substantially consuming electric power when the status is not checked.

A still further object of the present invention is to provide an output of high voltage but low current spikes which is effective in killing rodents but which is less dangerous to humans.

A still further object of the present invention is to provide a triggered timing circuit which limits the electrocution time to an interval which is effective in killing rodents but which limits the draw on the battery.

These and other objects and advantages of the present invention will become more apparent after studying the following discussion.

SUMMARY OF THE INVENTION

A pest electrocution device of the present invention includes an electronic circuit portion and a mechanical portion.

The mechanical portion of the device includes a base member which has a base plate and sidewalls integral with the base plate and extending upwardly from the base plate to define a basin, and a flexible or pliable sheet member which is secured on the shoulder or top edge of the sidewalls of the base member. A conductive plate member is attached to the top face of the flexible sheet member. At least part of the conductive plate member is not overlapped with the shoulder of the sidewalls of the base member, such that force applied on the metal plate member will cause downward bending of the flexible sheet member. A pair of opposing metal contacts are respectively mounted on the bottom face of the flexible sheet member and on the base plate. The two metal contacts are biased apart when zero force is applied to the flexible sheet member. The biasing force can be supplied by either the limited structural rigidity of the flexible sheet member, or by a mechanical biasing component (e.g. a spring) disposed either between the base plate and the flexible sheet or between the opposing contacts. The former creates a more sensitive trigger, while the latter will create a less sensitive trigger. The mechanical bias may be adjusted according to the application to which the device is applied. The two metal contacts functioning as a switch, are coupled to the trigger input of the electronic circuit portion of the device, while the metal plate member is coupled to the high voltage output of the electronic circuit portion of the device.

When a pest, such as a rodent steps on or passes over the conductive plate, the flexible sheet member is bent down under the weight of the rodent so that the pair of metal contacts are closed, thereby triggering the electronic circuit portion; a high voltage but low current pulse train is then applied through the rodent to a ground contact, either directly through the walls of the burrow, or through the base member to ground. Because the mechanical bias of the flexible sheet member requires a substantial commitment of the rodent's weight to the conductive plate member to close the opposing metal contacts, the force that the rodent must apply to the device in order to spring off of the device will create even better contact between the rodent and the conductive plate member 15. Thus, the efficacy of the device is substantially increased. Further, the rodent need only make contact with one surface to trigger the electronic circuit. Of course, a path to ground must exist for electrocution, but this is easily provided by a grounded frame member surrounding the high voltage plate, or the walls of the burrow.

The electronic circuit portion of the device includes a trigger circuit connected to the two opposite metal contacts for providing a trigger signal in response to the closure of the two metal contacts, and a timer circuit coupled to the output of the trigger circuit to produce a control signal with a preset duration. The control signal actuates a high voltage circuit for generating the high voltage low current pulse train which is supplied to the conductive plate member 15. The high voltage pulse train circuit is grounded either by connecting its ground lead to the base member which contacts the ground, or by connecting it to a conductive ground stake which is driven into the ground in proximity to the mechanical portion of the device.

The trigger mechanism in conjunction with the timer provides a number of advantages. First, once the circuit has been triggered and the electrocution commenced, even if the rodent shifts its weight such that the two opposing contacts have been opened, the electrocution will continue for the predetermined duration governed by the timer. Second, upon expiration of the predetermined time interval as governed by the timer, the high voltage pulse train ceases so that no further draw on the battery supply is maintained. This is so even if the dead rodent's weight continues to hold the two opposing contacts closed. Further, the device cannot be retriggered without being first reset by the user. Thus, if the user forgets to disconnect the device from its power supply prior to handling the device to remove the dead rodent, the user will not be shocked.

In accordance with the present invention, the electronic circuit portion is further provided with a latch circuit. The control signal from the timer is latched, recording the status of the device. The latch circuit output is connected to a switch and a light emitting diode (LED). When a user wants to check the status of the device, he need only close the switch. If upon engaging the switch the LED illuminates, the status of the electronic circuit is triggered and a rodent has been electrocuted. If the user does not check the status of the device, electric power will not be substantially consumed. This configuration avoids the use of an alarm light which would continuously consume the battery of the device until the user could reset it.

In a preferred embodiment, the high voltage generator circuit includes a relay circuit and a vibrator circuit for producing a high voltage but low current pulse train to electrocute the pest.

A timing adjustment circuit may be provided to preset the length of time for electrocuting the pest by presetting the timing cycle of the timer in accordance with the requirements of a particular application.

SUMMARY OF THE DRAWINGS

FIG. 3 is a longitudinal cross-sectional view of the mechanical portion of the device shown in FIG. 1.

FIG. 4 is a longitudinal cross-sectional view illustrating another embodiment of the mechanical portion of the device in accordance with the present invention.

DETAILED DESCRIPTION OF THE INVENTION

A pest electrocution device in accordance with the present invention includes a mechanical portion and an electronic circuit portion. The device is particularly useful for eliminating rodents and the like.

Figure 1:
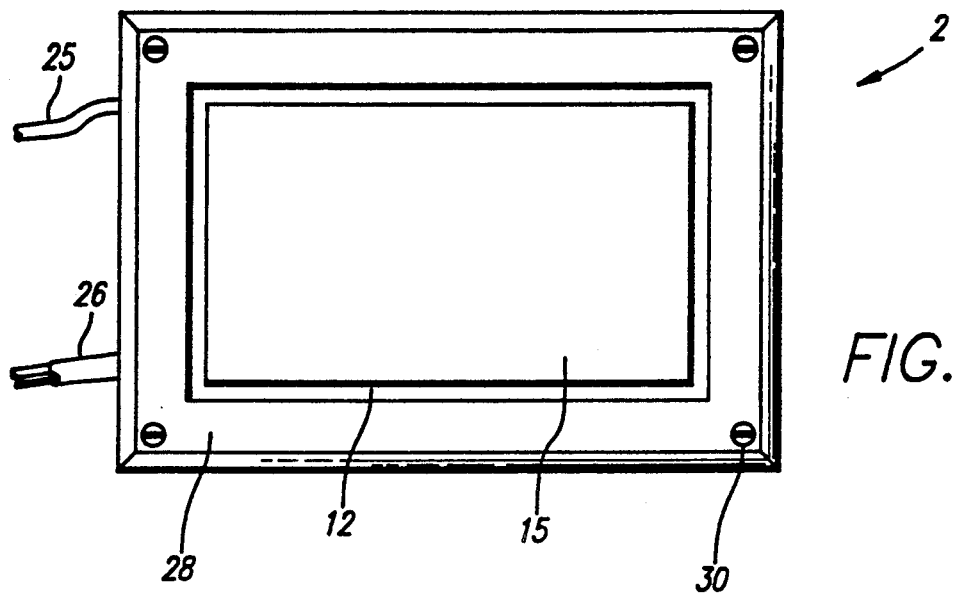
FIG. 1 is a top view of an embodiment of the mechanical portion of the pest electrocution device in accordance with the present invention.
Figure 2:
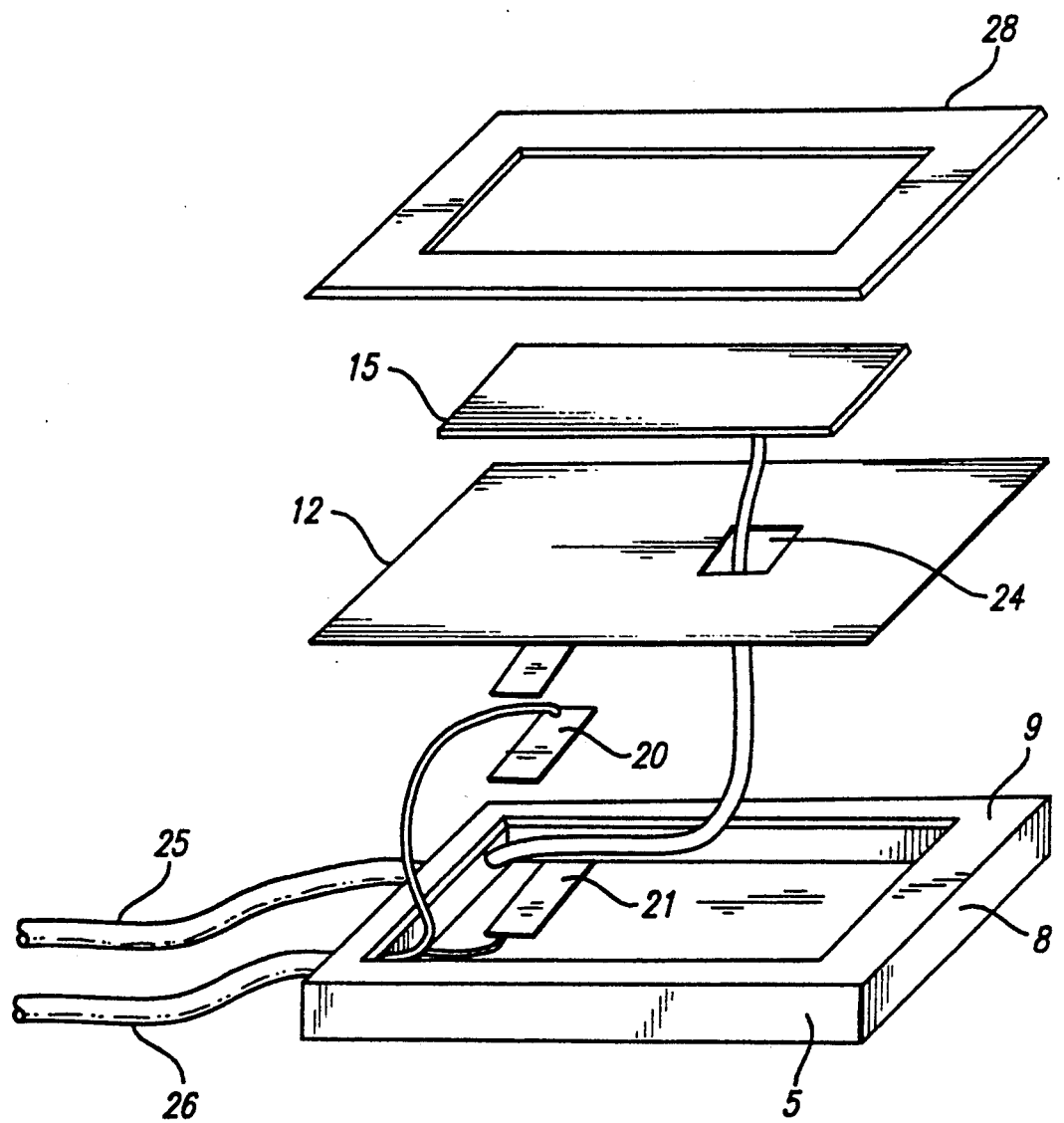
FIG. 2 is a perspective view of the mechanical portion of the device as shown in FIG. 1, wherein parts are separated.

Referring to FIGS. 1-3, there is shown an embodiment of the mechanical portion 2 of the pest electrocution device. The mechanical portion 2 of the device is provided with a base member 5, a flexible or pliable sheet member 12, and a metal plate member 15. The base member 5 has a rectangular-shaped base plate 7 and four sidewalls 8 integrated with the base plate and extending from the base plate upwardly to define a basin 6 therebetween. The flexible sheet member 12 has a size which is substantially the same as that of the base plate 7 so that the flexible sheet member 12 can be secured on the top edge or shoulder 9 of the sidewalls 8.

The flexible sheet member 12 is secured between the top edge 9 of the sidewalls 8 and a rim member 28 by rivets or screws 30. The rim member 28 has an opening with a size which is substantially the same as or a little larger than that of the basin 6 of the base member 5. The flexible sheet member 12 is made of electrically insulative and pliable material, such as plastic material and the like. The thickness of the sheet member 12 depends on the material used in this member and the desired sensitivity of the device. For a small and sensitive device, the sheet member 12 can be a 1 mil (i.e. 1/1000 of an inch) thick membrane.

The conductive plate member 15 is attached to the top face of the flexible sheet member 12 and connected to a high voltage output of the electronic circuit portion of the device (The electronic portion will be fully discussed later by reference to FIGS. 5 and 6). As an example of the connection between the conductive plate member and the high voltage output of the electronic circuit portion, a metal tab 22 is riveted on the bottom face of the conductive plate member 15 at a location where the flexible sheet member is provided with an opening 24 as shown in FIGS. 2 and 3. A conductive lead 25 is connected to the tab 22 and passes through a hole on one of the sidewalls 8 to couple with the high voltage output of the electronic circuit portion. In this embodiment, the conductive plate member 15 has a size which is smaller than that of the basin 6 of the base member 5, and is not overlapped with any shoulder or top edge 9 of the sidewalls 8 (FIG. 3).

A pair of metal contacts 20 and 21 are respectively secured on the bottom face of the flexible sheet member 12 and on the base plate 7 in the basin 6. The two metal contacts 20 and 21 face each other in opposition and are biased apart when no force is applied to the top of the device. The pair of metal contacts 20 and 21 functions as part of a switch for completing a low voltage trigger circuit in the electronic circuit portion of the device. These contacts are connected to the trigger inputs of the electronic circuit portion by means of a pair of conductive leads 26. Insulation spacers 17 and 18 may be used to further isolate the metal contacts 20 and 21 from the conductive plate member 15 and the base plate 7, as well as to decrease the space between the two contacts when the device is unloaded.

Whenever a rodent passes over or steps on the conductive plate member 15, the weight of the rodent will cause the flexible sheet member 12 to bend downwardly because of its pliable properties. This downward movement of the flexible sheet member 12 will bring the upper metal contact 20 toward the lower metal contact 21 so that the two contacts will be closed under the weight of the rodent. In order to increase the weight sensitivity of the flexible sheet member 12, the top edge 9 of some or all of the sidewalls 8 is provided with an inclined surface 10. The sensitivity of the switch mechanism may be adjusted through a number of other means, including increasing or decreasing the thickness of the flexible sheet member 12, choosing materials of greater or lesser flexibility for the flexible sheet member, or disposing a biasing mechanism (e.g. a spring) between the switches or between the flexible sheet member 12 and the base member 5.

In another embodiment of the pest electrocution device as shown in FIG. 4, one end of the conductive plate member 15 is overlapped with the shoulder 9 of one of the sidewalls B. In this alternative, the force on the conductive plate member 15 at point A will not cause closure of the two metal contacts 20 and 21 because there is insufficient leverage at point A. If the rodent moves to point B, the contacts will be immediately closed. This configuration ensures that the metal contacts 20 and 21 are closed only after a large portion of the rodent's body is over the plate member 15.

With the configurations of the present invention, a number of advantages have been achieved. For example, this device can have a very sensitive mechanical switch mechanism (formed by the members 12 and 15, and the contacts 20 and 21), yet the structure is simple and the device size is small. This device can be disposed in the burrow or the tunnel of rodents or in other restricted areas. When this device is used in the burrow or passage way of rodents, bait is not necessarily needed. Further, since their is no voltage on the conductive plate member 15 before the device is triggered, the rodent cannot sense it With its whiskers, tail or through other sensing means. In addition, the present invention does not require that the rodent touch two different metal elements simultaneously to trigger the high voltage current. Whenever a rodent steps on the device such that a sufficient commitment of its weight causes the two opposing contacts 17 and 18 to close, electrocution will commence immediately. Because the mechanical bias of the device requires a substantial disposition of the rodent's weight over it before it can be triggered, the rodent cannot easily spring off of the device prior to complete electrocution. Any force that the rodent may direct onto the device for springing off will only serve to improve the contact between the conductive plate member 15 and the rodent. Thus, the efficacy of the device is substantially increased because an incidental contact between a rodent and the device (i.e. one that may simply knock the rodent down) will not trigger the device and thereby place the device out of commission until reset by the user at some later time.

The high-voltage circuit will be completed either because the rodent is in contact with both the conductive plate member 15 and the grounded rim member 28, the base member 5, or the walls of its tunnel.

Figure 5:
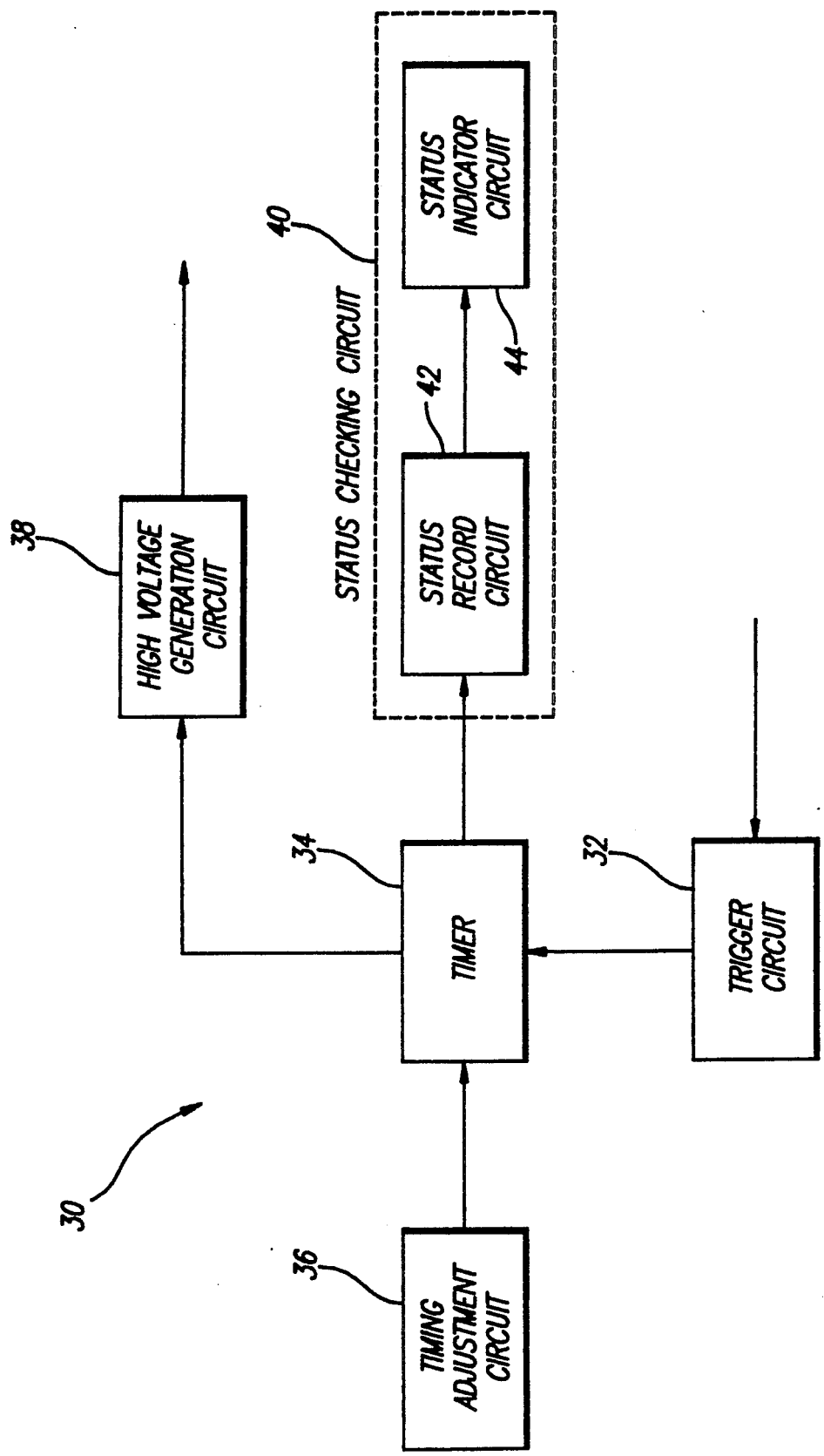
FIG. 5 is a block diagram illustrating an embodiment of the electronic circuit portion of the pest electrocution device in accordance with the present invention.
Figure 6:
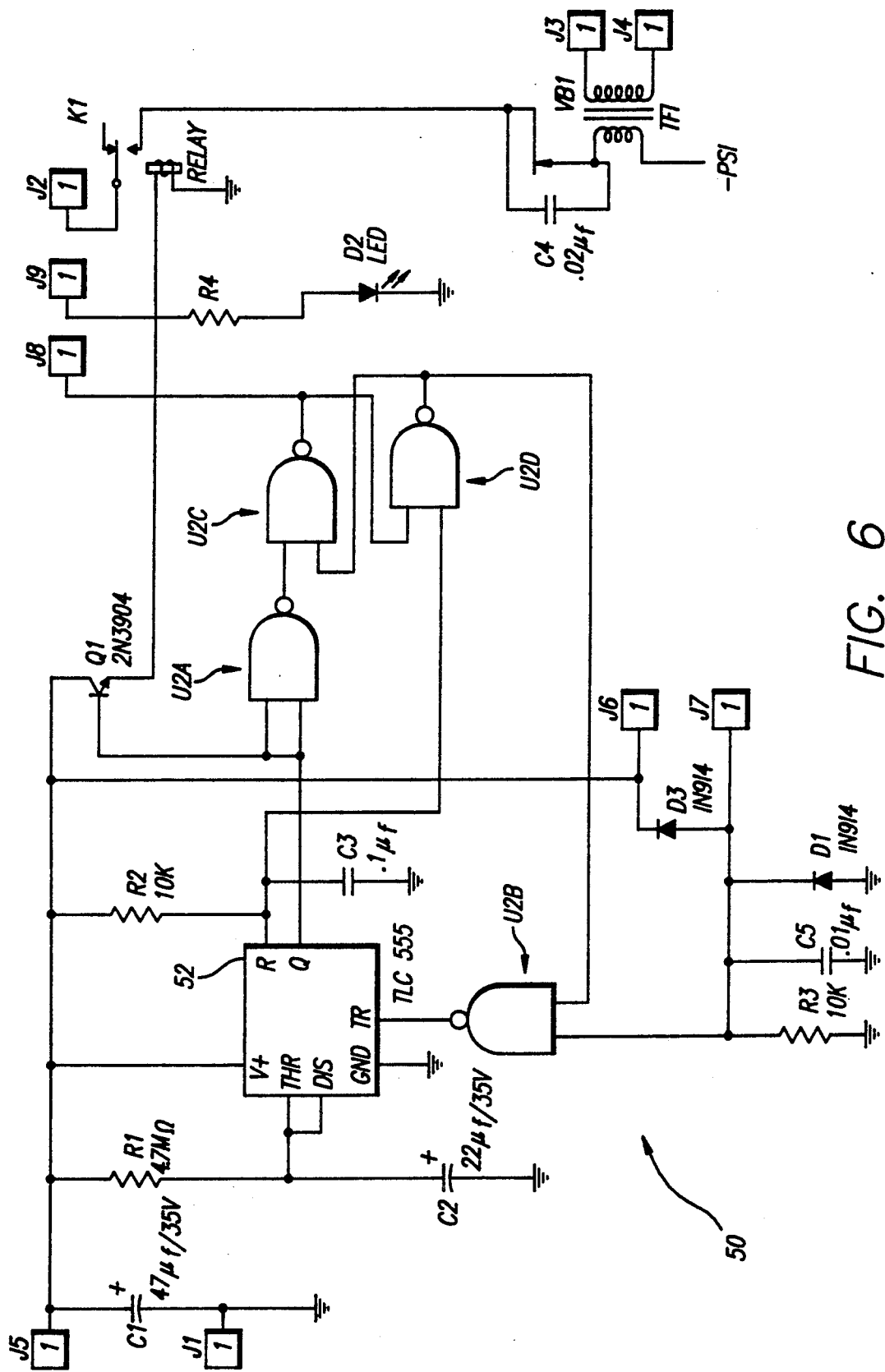
FIG. 6 is a circuit schematic showing another embodiment of the electronic circuit portion of the pest electrocution device in accordance with the present invention.

Turning now to FIG. 5, an embodiment of an electronic circuit portion 30 of the pest electrocution device is shown. The electronic circuit portion 30 is provided with a trigger circuit 32 for producing a trigger signal in response to the closure of the two metal contacts 20 and 21 in the mechanical portion of the device. A timer 34 having a trigger input is coupled to the trigger circuit 32 for providing control signals which are active for a predetermined length of time in response to the trigger signal. A high voltage generator circuit 38 is connected to the output of the timer 34 and generates a high voltage but low current pulse generator for the predetermined duration under control of the timer 34. The high voltage is applied to the conductive plate member 15 through the high voltage lead 22 to electrocute the rodent.

A timing adjustment circuit 36 may be provided to set up or adjust the duration of the control signal of the timer 34. In one embodiment, a programmable timer may be suitable for this purpose. For instance, the timing cycle of the timer 34 may be preset by the timing adjustment circuit 36 to a time length between 30 seconds and 5 minutes depending on the type of pests or rodents to be electrocuted. Once the timer is triggered, it turns itself off at the end of the preset time duration and thereby preserves battery life. Further, the timer is non-retriggerable and stays in a low-power state once it has been triggered until the user resets it.

The electronic circuit portion 30 of the device further includes a status checking circuit 40 which is connected to the output of the timer 34 for checking the status of the device, i.e., whether any rodent has been electrocuted. The checking circuit 40 includes a status record circuit 42 for recording the status of the device. The record of the device status can be checked at any time to see whether a triggering of the electronic circuit and therefore an electrocution of a rodent has occurred through use of a status indicator 44. By using the status checking circuit, an alarm lamp is not needed to advise the user of the status of the device. As an example of the status indicator 44, a switch and a light emitting diode (LED) may be coupled to the status record circuit 42. When the user wants to check the status of the device, he need only close the switch to see whether the LED illuminates, without disturbing the burrow or removing the device. In addition, power is saved because the circuits remain in low-power mode while the status is not checked. This is important because a battery is normally used as the power source of the device.

The high voltage generation circuit 38 preferably includes a circuit which produces a high voltage but low current pulse train which can reliably kill the rodents with minimal or no danger to human users. The voltage of the pulse spikes may be ranged from 500 volts to 7000 volts. Further, the circuit is self-regulating in that if the load is small (i.e. low resistance), the voltage level of the pulse train will decrease; if the load is high, the amplitude of the voltage spikes will increase in response to the smaller current draw. Thus, the instant invention will be safer for humans to handle.

FIG. 5 illustrates another embodiment of the electronic circuit portion of the pest electrocution device in accordance with the present invention. The electronic circuit portion 50 of the device includes a timer 52 for providing timing and control signals. A number of timers available in the market are suitable for use in the present invention, such as the low power timer TLC555. The electronic portion 50 also includes NAND gates U2A, U2B, U2C and U2D, which in the preferred embodiment are contemplated to be of a low power variety such as CMOS. NAND gate U2B has its output connected to the trigger input (TR) of the timer 52, and has one of its inputs connected to terminals J6 and J7 with a diode D3 coupled therebetween. The terminals J6 and J7, in turn, are connected to the metal contacts 20 and 21 in the mechanical portion of the device. A resistor R3, a capacitor C5 and a diode D1 and D2 are connected in parallel between the terminal J7 and ground to maintain a low voltage at one of the inputs of the NAND gate U2B until the terminals J6 and J7 are closed. The resistor R3, capacitor C5 and the diode Di also function to reduce the noise during operation. The terminal J6 is further connected to a DC power source, such as a nine volt battery (not shown).

Terminals J1 and J5 are connected to a DC power source such as a nine volt battery with a power supply capacitor C1 coupled therebetween. Threshold input (THR) and discharge input (DIS) of the timer 52 are coupled to a resistor R1 and a capacitor C2 which are in a series relationship and connected to the DC power source so as to charge up the timer to reach a threshold. This DC power supply is also supplied to power supply input V+ of the timer 52.

The timer 52 has a timing and control output denoted by Q and a reset input denoted by R. The reset input R is coupled between a resistor R2 and a capacitor C3 which, in turn, are connected in series between the DC power source and the ground. The resistor R2 and capacitor C3 provide a power-on-reset to insure that voltage level of the reset input is low for a time after power-up and then high thereafter. This insures that the timing circuit is armed on power-up. This node is also connected to one of the inputs of NAND gate U2D to insure that the RS Flip-flop comprising NAND gates U2D and U2C powers up in the correct state as well.

Before the timer 52 is triggered, the output Q remains at a low voltage level. After the timer 52 is triggered, the voltage at output Q goes high. Once triggered, the timer 52 is not retriggerable until the circuit is reset by the user.

The output Q of the timer 52 is coupled to the base terminal of a transistor Q1 which drives a relay K1. The relay K1 is connected between a pulse vibrator VB1 and a power source denoted by a terminal J2. The pulse vibrator VB1 includes a capacitor C4 and a transformer TF1. When the timer 52 is triggered, the timer 52 produces an active high control signal on its output Q, having a timed length and which turns on the transistor Q1. The transistor Q1 then closes the relay K1 to provide DC power to the pulse vibrator VB1. DC power is supplied to the pulse vibrator by a DC supply (e.g. a nine volt battery) separate from that of the rest of the electronic portion 50 and connected between terminals J2 and -PS1. Thus, the primary coil of the transformer TF1 induces a high voltage pulse current in the secondary coil of the transformer TF1. The secondary coil of the transformer TF1 is connected between the conductive plate member 15 of the mechanical portion of the device and ground via terminals J3 and J4 for delivering the high voltage but low current pulse train to the rodent.

A person of ordinary skill would recognize that other forms of amplified voltage and current, such as DC voltage and current would also be effective in electrocuting rodents. The embodiment disclosed is preferred because it can be made cheaply, consumes less power and is safer for humans than other methods for producing similarly lethal outputs.

The output of the timer 52 is also coupled to a latch circuit which records the voltage level changes on the output Q. NAND gate U2A functions as an inverter for the output voltage of the output Q. In one embodiment, an RS latch circuit is formed by the two NAND gates U2C and U2D. The output of NAND gate U2A is connected to one of the inputs of NAND gate U2C. The power-on-reset node which is connected to the R input of the timer 52 is also connected to one of the inputs of NAND gate U2D. A switch coupled between the node connected to the input R of timer 52 and ground, when closed by the user, will force this node to ground and will thereby reset both the timer 52 and the RS latch without the need to disconnect the device from power. The preferred embodiment, however, is contemplated without the reset switch because requiring the device to be powered down for reset is inherently safer for the user and reduces the cost of manufacture. The output of NAND gate U2D is also coupled to one of the inputs of NAND gate U2B.

The output of the latch circuit is connected to a switch and a light emitting diode (LED) to form a status checking circuit for allowing a user to push a button any time to check the status of the device. A resister R4 is placed in series with the light emitting diode to limit the current drawn by the diode wherein the switch is closed. In this particular embodiment, the output of NAND gate U2C is the output of the latch which is coupled to a switch Si denoted by terminals J8 and J9. Terminal J9 is connected to a light emitting diode D2 to ground. Through use of the latch circuit, the switch and the LED, the status checking circuit has an extremely low power drain and therefore a nominal effect on battery life.

When the pest electrocution device is powered up for use (i.e. the DC power is supplied to the electronic circuit portion of the device), the power-on-reset circuit holds the R input to the timer and the input to NAND gate U2D of the RS latch low for a brief period so that the timer is reset and its output Q is low, and so that the output of NAND gate U2C is also low. When the metal contacts 20 and 21 of the mechanical portion of the device are closed, the terminals J6 and J7 are connected and one of the inputs of the NAND gate U2B goes high so that the output of the NAND gate U2D goes low, triggering the timer 52. When the timer 52 is triggered, the output Q of the timer goes high and the output of the inverter U2D becomes low. Accordingly, the output of the NAND gate U2C becomes high indicating that the electronic circuit hd been triggered and a rodent has been electrocuted. After the timed cycle of the timer is complete, output Q of timer 52 returns to a low state but the voltage status at the output of the NAND gate U2C is latched and will remain unchanged until the manual reset button connecting terminals J10 and ill is closed by the user to reset output R of the timer and the RS latch.

The electronic circuit portion of the device can be housed in an independent small box which can be disposed in a place far from the location where the mechanical portion is located. Further, instead of using holes in the sidewalls 8 of the base member 5 through which to pass the conductive leads 25 and 26, conventional plug and socket configurations (not shown) can be used for the lead connections between the mechanical portion and the electronic circuit portion of the device during use.

In the embodiments discussed above, the base member 5 and the rim member 28 are made of conductive material and are electrically connected to each other by conductive screws 30. Thus, the ground output lead of the pulse vibrator (i.e. terminal J4) or the high voltage generation circuit 38 can be connected to the base member 5 to ground. Therefore, for the rodent to be electrocuted, the current can flow from the conductive plate member 15 through the rodent to the rim member 28 and base member 5 to ground, or from the plate through the rodent to the wall of the tunnel.

Figure 7:
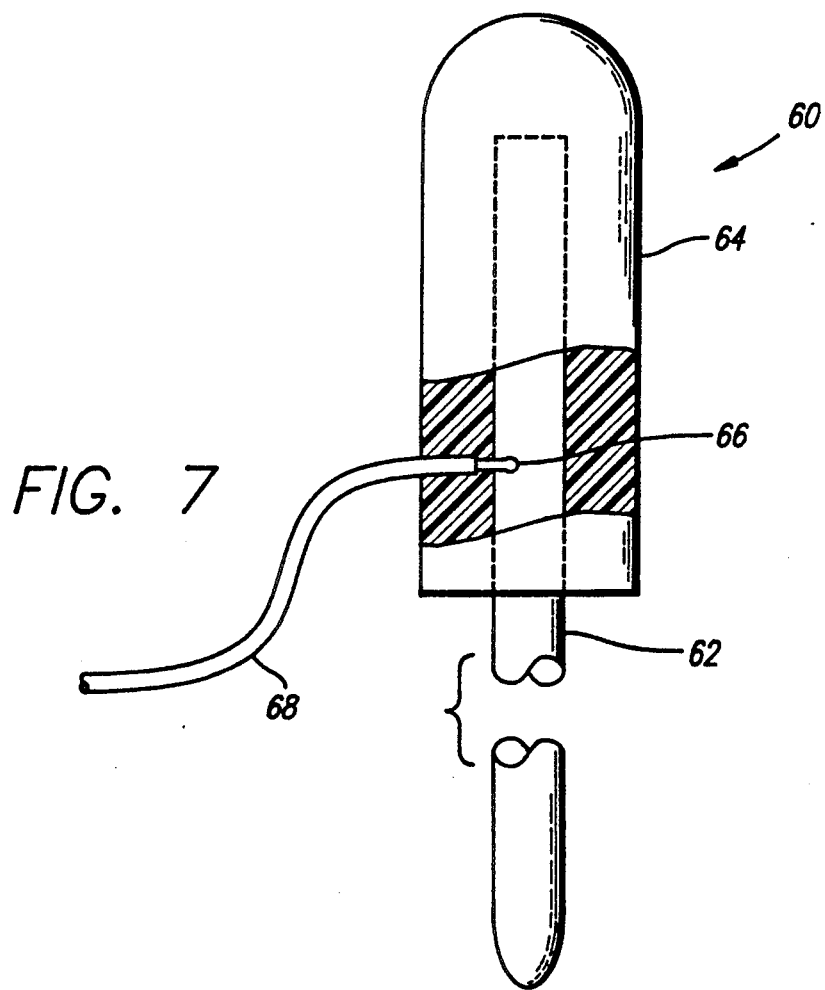
FIG. 7 shows a ground stake which can be used in the present invention for providing a better electrical contact between the pest and the ground during operation.

Alternatively, a ground stake member 60 is provided, as shown in FIG. 7. The ground stake member 60 includes a conductive metal rod 62, partially encapsulated in a handle 64 of plastic or other insulative material. An attachment point 66 is provided on the rod 62 for connecting a lead 68 from the output ground lead of the pulse vibrator (i.e. terminal J4) or the high voltage generation circuit by passing the lead 68 through the handle. During use, the metal rod 62 can be inserted into the soil so as to ensure better contact with the ground. Using this alternative, the base member 5 can be made of electrically insulative material, such as plastic material. In this embodiment, the fatal current flows from the plate 15 through the rodent to the wall of the animal's tunnel.

What has been described above are the preferred embodiments of a pest electrocution device in accordance with the present invention. It would be apparent that many modifications to the disclosed invention are possible without departing from the true spirit and scope of the invention. For example, instead of a rectangular shape, the mechanical portion of the device may be made in other shapes, such as a round shape. Further, the flexible member 12 could be replaced by an inflexible member with a hinge at one end and a spring mechanism or its equivalent to mechanically bias the metal contacts apart when no load is present on top of the device. In addition, the device may be manufactured using any number of materials, provided they meet the characteristics of conductivity, nonconductivity, flexibility, etc. as appropriate to the various components as defined in the specification. Finally, the surface area of the device could be increased by disposing any number of opposing pairs of metal contacts under any number of conductive plates connected to any number of electronic circuits which generate a high voltage but low current pulse train to each of those conductive plates.

What is claimed is:

1. A pest electrocution device, comprising:
   a base member having a base plate and sidewall integral with said base plate, said sidewall extending upwardly from said base plate to define a basin;
   a flexible sheet member having a size substantially the same as that of said base plate and disposed on the top edge of said sidewall of said base member;

a conductive plate member attached to the top face of said flexible sheet member and having at least a part not overlapped with said top edge of said sidewall;

at least two contacts with one of said at least two contacts secured to the bottom face of said flexible sheet member and another of said at least two contacts secured on the top face of said base plate, said at least two contacts facing each other and mechanically biased apart when no load is applied to said flexible sheet member;

an electronic circuit having a trigger input coupled to said at least two contacts, said electronic circuit further including a high-voltage output coupled to said conductive plate member;

whereby when the weight of a pest is applied to said metal plate member, said flexible sheet member is bent downwardly to close said at least two contacts to trigger said electronic circuit.

2. The pest electrocution device recited in claim 1 wherein said electronic circuit imposes a high voltage but low current on said conductive plate member for a predetermined time interval when said electronic circuit is triggered.

3. The pest electrocution device recited in claim 2 wherein said high voltage but low current is of sufficient magnitude to electrocute a pest.

4. The pest electrocution device recited in claim 2 further including a rim member having an opening with a size that is substantially the same as that of said basin and disposed on the top edge of said sidewalls of said base member, whereby said flexible sheet member is secured between said base member and said rim member.

5. The pest electrocution device recited in claim 4, wherein the top edge of said sidewall for at least one end of said base member has an inclined portion whereby said flexible sheet member is more easily bent downward.

6. The pest electrocution device recited in claim 4 wherein said electronic circuit includes a status checking means for indicating the status of the device, said checking means dissipating no power unless activated.

7. The pest electrocution device recited in claim 6 wherein said rim member is conductive and is conductively connected to said base member.

8. The pest electrocution device recited in claim 6 further including a grounding means in substantial contact with the earth and coupled to said electronic circuit, for providing a low resistance path to the earth.

9. The pest electrocution device recited in claim 8 wherein said electronic circuit further includes a means for resetting said electronic circuit after said electronic circuit has been triggered.

10. The pest electrocution device recited in claim 9, wherein said electronic circuit further comprises:

a timer means for producing a control signal of a predetermined duration in response to closure of said at least two contacts, a latch means coupled to said timer means for recording the status of said electronic circuit, said latch means coupled to said status checking means, a high voltage generation means coupled to said timer means for generating a high voltage is response to the control signal produced by said timer means, said generation means conductively coupled to said conducive plate means.

11. The pest electrocution device recited in claim 10, wherein said electronic circuit further includes a trigger means, coupled to said at least two contacts and to said timer means, for generating a trigger signal to trigger said timer means.

12. A pest electrocution device, comprising:

a mechanical portion including:

(a) a base member having a base plate and sidewall extending from said base plate and defining a basin, (b) a flexible sheet member having a size substantially the same as that of said base plate and secured on the top edge of said sidewall, (c) a conductive plate member secured on the top face of said flexible sheet member, (d) a pair of opposing metal contacts spaced apart with one of said metal contacts secured on said base plate in said basin and the other contact secured on the bottom face of said flexible sheet member, (e) whereby when weight of a pest is applied on said flexible sheet member, said flexible sheet member is bent downwardly to close said pair of metal contacts, an electronic circuit portion including:

(a) a timer having a triggerable input coupled to said metal contacts, said timer producing a control signal of a predetermined duration when said metal contacts are closed, (b) a high voltage generator means, coupled to said timer and said conductive plate member, said high voltage generator means for providing a high voltage but low current to a pest on said conductive plate member in response to said control signal.

13. The pest electrocution device recited in claim 12 further including a latch means coupled to said timer for recording the status of said electronic portion.

14. The pest electrocution device recited in claim 13 wherein said timer further includes a means for adjusting the predetermined duration of said control signal.

15. The pest electrocution device recited in claim 14 wherein said electronic portion further includes a switch and a light emitting diode, said switch coupled between said diode and said latch means, whereby said diode is illuminated when said switch is closed and said timer has been triggered to indicate the triggered status of said electronic portion.

16. The pest electrocution device recited in claim 15, wherein said electronic portion further includes a means for resetting said electronic portion after said electronic portion has been triggered.

17. The pest electrocution device of claim 16 further including a conductive ground stake, said stake in substantial contact with the earth and coupled to said high voltage generator means.

18. A pest electrocution device, comprising:

a base member having a base plate and sidewall integral with said base plate, said sidewall extending upwardly from said base plate to define a basin;

a flexible sheet member having a size substantially the same as that of said base plate and disposed on the top edge of said sidewall of said base member;

a conductive plate member attached to the top face of said flexible sheet member and having at least a part not overlapped with said top edge of said sidewall;

an electronic circuit having a trigger input, said electronic circuit further including a high-voltage output coupled to said conductive plate member;

a switch means for triggering said electronic circuit, said switch means in mechanical communication with said flexible sheet member and having at least two contacts, said contacts being conductively disconnected when no load is applied to said flexible sheet member; and operative when the weight of a pest is applied to said metal plate member, causing said flexible sheet member to bend downwardly, conductively connecting said at least two contacts of said switch means to trigger said electronic circuit.

* * * * *

UNITED STATES PATENT AND TRADEMARK OFFICE
CERTIFICATE OF CORRECTION

PATENT NO. : 5,269,091
DATED : December 14, 1993
INVENTOR(S) : Johnson et al.

It is certified that error appears in the above-identified patent and that said Letters Patent is hereby corrected as shown below:

Column 1, line 49, cancel "Sep." and insert --Sept.--
Column 2, line 40, cancel "Jun." and insert --June--
Column 2, line 43, cancel "Jun." and insert --June--
Column 5, line 54, cancel "The" and insert --the--
Column 6, line 37, cancel "B" and insert --8--
Column 6, line 56, cancel "With" and insert -with--
Column 8, line 25, cancel "Di" and insert --D1 and D2--
Column 9, line 39, cancel "wherein" and insert --when--
Column 9, line 42, cancel "Si" and insert --S1--
Column 9, line 63, cancel "hd" and insert --had--
Column 9, line 68, cancel "ill" and insert --J11--
Column 11, line 65, cancel "is" and insert --in--

Signed and Sealed this

Ninth Day of August, 1994

Attest:

Attesting Officer

BRUCE LEHMAN
Commissioner of Patents and Trademarks